(12) United States Patent  (10) Patent No.: US 8,089,547 B2
Lin  (45) Date of Patent: Jan. 3, 2012

(54) PLURAL-VIEW DEVICE

(75) Inventor: Tsung-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 324 days.

(21) Appl. No.: 12/422,978

(22) Filed: Apr. 13, 2009

(65) Prior Publication Data

US 2009/0256946 A1 Oct. 15, 2009

(30) Foreign Application Priority Data

Apr. 14, 2008 (CN) .......................... 2008 1 0301126

(51) Int. Cl.
*H04N 5/222* (2006.01)
*H04N 5/225* (2006.01)

(52) U.S. Cl. .................................. 348/333.01; 348/373

(58) Field of Classification Search .............. 348/333.01
See application file for complete search history.

(56) References Cited

U.S. PATENT DOCUMENTS

| 5,532,736 | A | * | 7/1996 | Kuriki et al. ................ 348/14.16 |
| 5,666,153 | A | * | 9/1997 | Copeland ...................... 348/14.1 |
| 5,953,052 | A | * | 9/1999 | McNelley et al. .......... 348/14.16 |
| 6,104,424 | A | * | 8/2000 | McNelley ................... 348/14.16 |
| 2002/0061767 | A1 | * | 5/2002 | Sladen et al. .................. 455/556 |
| 2005/0195316 | A1 | * | 9/2005 | Kollias et al. ................. 348/370 |
| 2005/0239520 | A1 | * | 10/2005 | Stefansen ................... 455/575.1 |
| 2007/0035661 | A1 | * | 2/2007 | Resner et al. .................. 348/468 |
| 2009/0059052 | A1 | * | 3/2009 | Lin et al. ................... 348/333.01 |
| 2009/0286573 | A1 | * | 11/2009 | Jang et al. ..................... 455/566 |

FOREIGN PATENT DOCUMENTS

CN 2610773 Y 4/2004

* cited by examiner

*Primary Examiner* — Lin Ye
*Assistant Examiner* — Amy Hsu
(74) *Attorney, Agent, or Firm* — Altis Law Group, Inc.

(57) ABSTRACT

An exemplary plural-view device includes a plane mirror, a display panel, a support member connected to the plane mirror or the display panel, and a camera module. The camera module is mounted to the support member and electrically connected with the display panel. The support member is adjustable relative to at least one of the plane mirror and the display panel for adjusting a field of view of the camera module.

15 Claims, 3 Drawing Sheets

PLURAL-VIEW DEVICE

BACKGROUND

1. Technical Field

The present disclosure relates generally to viewing devices, and more particularly to a device providing plural views of a person or object simultaneously.

2. Description of Related Art

Mirrors are most commonly used for personal grooming, decoration, and architecture. Typically, if a person wants to see both his front and back at the same time, he must use two or more mirrors inclined relative to one another (also called face-to-face mirrors) to generate multiple reflections. However, the typical structure or arrangement of face-to-face mirrors is bulky and inconvenient.

Therefore, what is needed is a plural-view device to overcome the above-described deficiencies.

DETAILED DESCRIPTION

Figure 1:
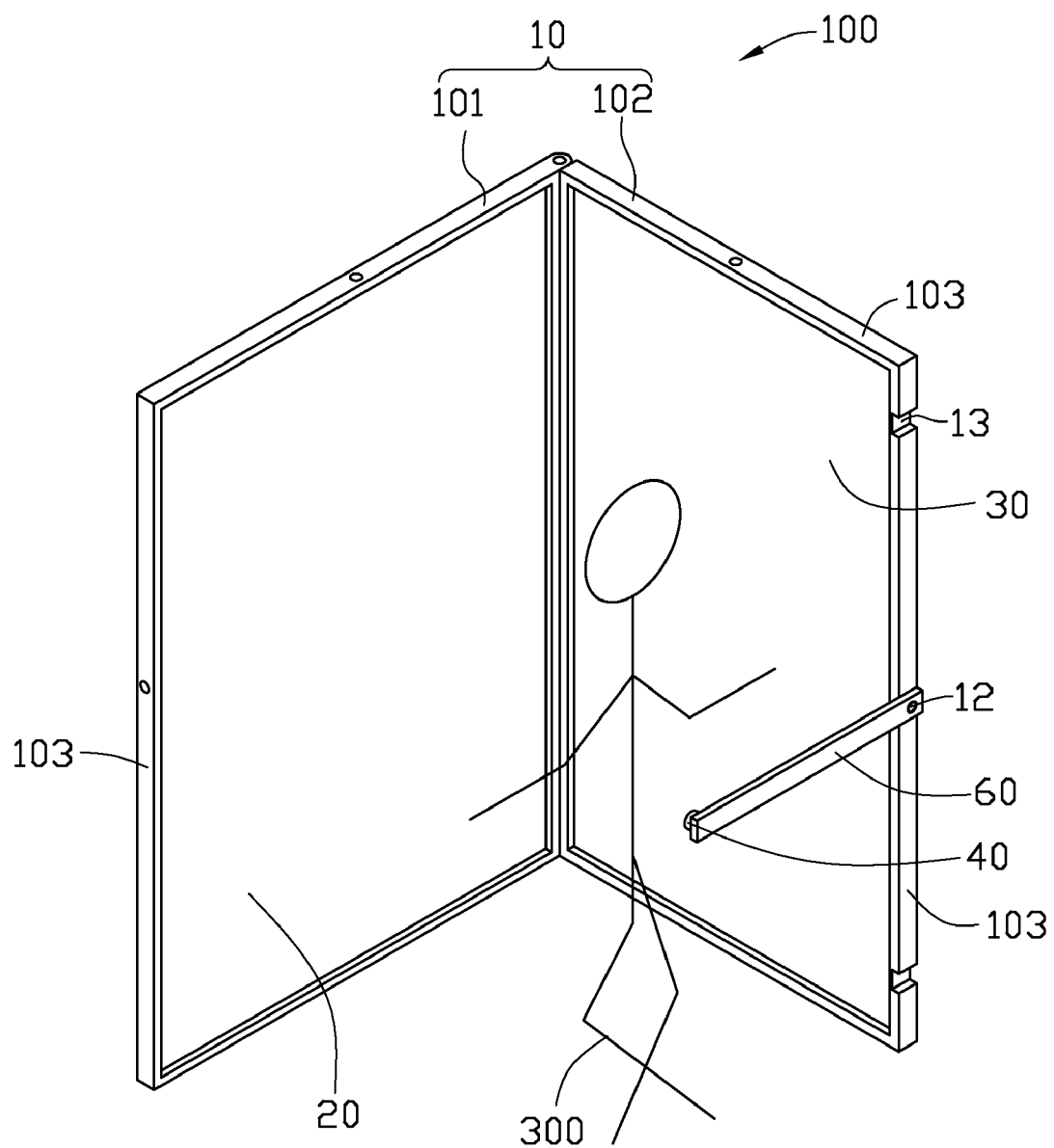
FIG. 1 is a schematic view of a plural-view device in accordance with a first embodiment, the plural-view device including a support rod, a camera module, and a power supply.
Figure 2:
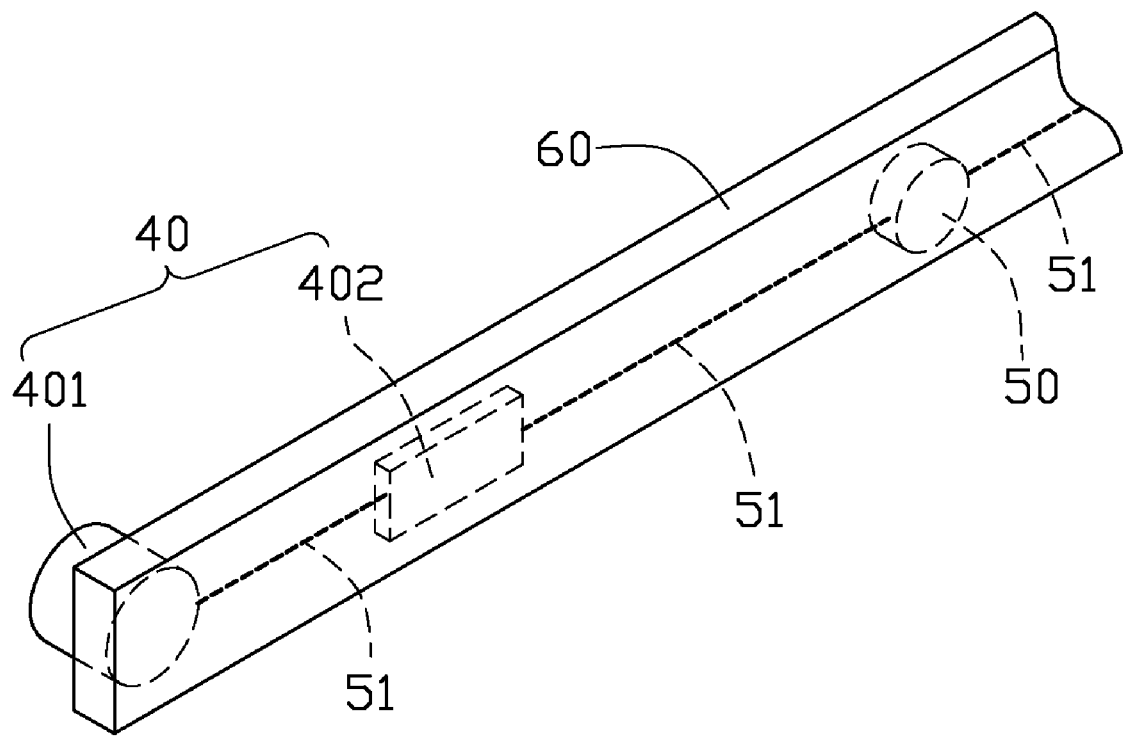
FIG. 2 is an enlarged, schematic view of the camera module and part of the support rod of FIG. 1, showing a power supply in the support rod.

Referring to FIGS. 1 and 2, a plural-view device 100 according to a first embodiment is shown. The plural-view device 100 includes a frame 10, a plane mirror 20, a display panel 30, a camera module 40, a power supply 50, and a support rod 60. In this description, unless the context indicates otherwise, a "plane mirror" means a mirror that is physically substantially flat, regardless of the type of reflected image or images that the mirror is capable of displaying.

The frame 10 includes a first frame body 101 and a second frame body 102. The plane mirror 20 and the display panel 30 are respectively enclosed in the first frame body 101 and the second frame body 102. In the first embodiment, the first frame body 101 and the second frame body 102 are rectangular, and the first frame body 101 is pivotably connected with the second frame body 102. In particular, the second frame body 102 is rotatable in a first direction onto the first frame body 101. In this way, the first and second frame bodies 101, 102 are sandwiched together parallel to each other, such that the plural-view device 100 has a collapsed configuration. Furthermore, the second frame body 102 can be rotated in a second direction opposite to the first direction so that the second frame body 102 is sandwiched together with the first frame body 101 at a backside of the first frame body 101. In this way, the second frame body 102 is stowed or hidden behind the first frame body 101 when desired.

The display panel 30 is an electronic paper (e-paper), a digital frame, or other display device. In the exemplary embodiment, the display panel 30 is an e-paper. The e-paper typically includes a rewritable display panel and a flexible substrate. The e-paper is considered to be more convenient and comfortable to read than conventional displays. This is due to the e-paper having a stable image and a wide viewing angle, and being lightweight.

The camera module 40 is connected to the frame 10 via the support rod 60. The power supply 50 is configured for supplying electrical power to the display panel 30 and the camera module 40. In the exemplary embodiment, the power supply 50 is a battery. The support rod 60 can be moved toward or away from the frame 10. That is, the support rod 60 is adjustable about either or both of the plane mirror 20 and the display panel 30, for adjusting a field of view of the camera module 40. The support rod 60 may be a flexible rod, or an extension rod, or a combination of a flexible rod and an extension rod. The support rod 60 also may be a rigid rod pivotably connected with the frame 10, as illustrated.

In the illustrated embodiment, the camera module 40 is attached to a distal end of the support rod 60. The other end of the support rod 60 is pivotably connected to a middle portion of one vertical side border 103 of the second frame body 102 via a fastener such as a bolt 12. That is, the bolt 12 interconnects the support rod 60 and the side border 103. Two grooves 13 are defined in the same side border 103 symmetrically about the bolt 12. The grooves 13 are configured to selectively receive the camera module 40 when the support rod 60 is rotated to be parallel with the side border 103.

Referring to FIG. 2, the camera module 40 includes an image capture module 401 and a processing module 402. The power supply 50 is mounted in the support rod 60. The image capture module 401, the processing module 402, the power supply 50, and the display panel 30 are electrically connected to each other via a conducting wire 51. The image capture module 401 may be a charge coupled device (CCD) or a complementary metal oxide semiconductor (CMOS). When a person 300 stands facing the mirror 20, the camera module 40 can be positioned to take an image of the person's back by adjusting the support rod 60. After being processed by the processing module 402, the captured image is displayed on the display panel 30. Thus, the person 300 can see both front and back views in the plural-view device 100 simultaneously. It is to be understood that the position of the support rod 60 on the frame 10 is not limited to the position described above or illustrated in FIG. 1. The support rod 60 may be pivotably mounted at any suitable position of the frame 10. Furthermore, if the support rod 60 is a flexible rod, an end of the support rod 60 may be fixedly connected to the frame 10.

In an alternative embodiment, the plane mirror 20 may be provided in the second frame body 102, and the display panel 30 may be provided in the first frame body 101. With such a configuration, the person 300 can see both front and side views in the plural-view device 100 simultaneously. In another alternative embodiment, the plane mirror 20 may instead be a nonplanar kind of mirror.

Figure 3:
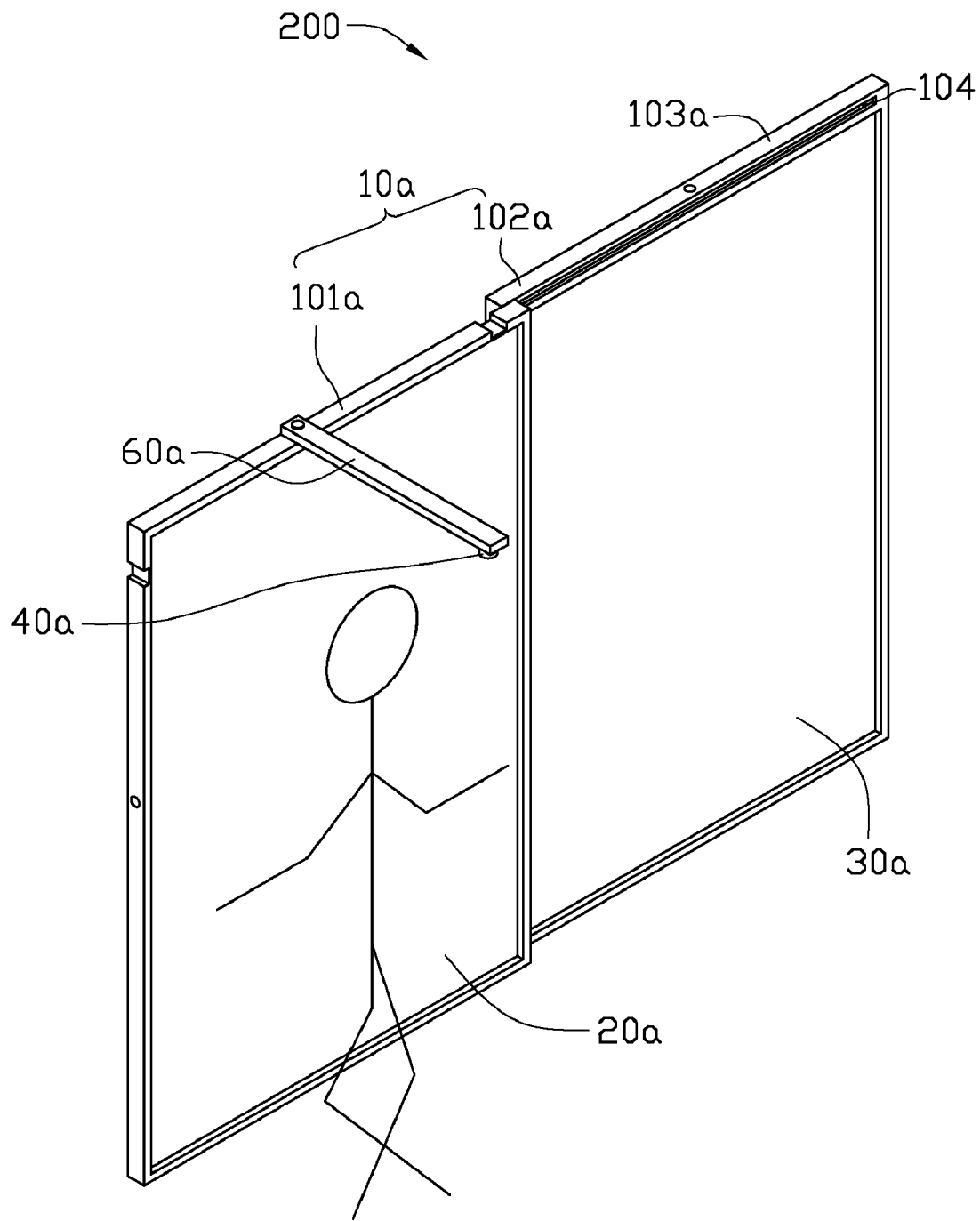
FIG. 3 is a schematic view of a plural-view device in accordance with a second embodiment.

Referring to FIG. 3, a plural-view device 200 according to a second embodiment is shown. The plural-view device 200 includes a frame 10a, a plane mirror 20a, a display panel 30a, a camera module 40a, a power supply (not shown), and a support rod 60a. The frame 10a includes a first frame body 101a and a second frame body 102a. The plane mirror 20a and the display panel 30a are respectively enclosed in the first frame body 101a and the second frame body 102a. The structure of the plural-view device 200 is similar to that of the plural-view device 100 of the first embodiment. One difference is that a slot 104 is defined in a top side border 103a of the second frame body 102a, and a block (not shown) protrudes out from the backside of one top corner of the first frame body 101a. The block is movably engaged in the slot 104, allowing the first frame body 101a to slide relative to the second frame body 102a along the extending direction of the slot 104. The second frame body 102a can thus be hidden behind the first frame body 101a when desired. Another difference is that the support rod 60*a* is pivotably connected to a middle portion of one horizontal side border 103*a*. Thus, a person (not labeled) can see both front and top views in the plural-view device 200 simultaneously. Furthermore, it is to be understood that the position of the support rod 60*a* on the frame 10*a* is not limited to the position described above or illustrated in FIG. 3.

While preferred or exemplary embodiments have been described, the embodiments can be modified within the spirit and scope of this disclosure. This disclosure is intended to cover any variations, uses, or adaptations of the embodiments using the general principles of the invention as claimed. Further, this disclosure is intended to cover such departures from the present embodiments as come within known or customary practice in the art to which the invention pertains and which fall within the limits of the appended claims or equivalents thereof.

What is claimed is:

1. A plural-view device comprising:
   a mirror;
   a display panel;
   a first frame holding the mirror;
   a second frame holding the display panel;
   a support member comprising a support rod pivotably connected to a side border of at least one of the first frame and the second frame, the side border of the at least one of the first frame and the second frame comprising a first groove defined therein; and
   a camera module mounted to the support rod, and being electrically connected with the display panel, the support rod being adjustable relative to at least one of the mirror and the display panel for adjusting a field of view of the camera module, and the camera module being capable of being received in the first groove of the side border of the at least one of the first frame and the second frame when the support rod is rotated to be parallel with the side border.

2. The plural-view device of claim 1, wherein the display panel comprises an electronic paper electrically connected with the camera module.

3. The plural-view device of claim 1, wherein the display panel comprises a digital frame electrically connected with the camera module.

4. The plural-view device of claim 1, wherein the support rod is one of a flexible rod, an extension rod, and a combination of a flexible rod and an extension rod.

5. The plural-view device of claim 1, wherein the mirror is a plane mirror, and at least one of the first and second frames is capable of being moved so that the first and second frames are sandwiched together parallel to each other.

6. The plural-view device of claim 5, wherein the first and second frames are pivotably connected together, and one of the first and second frames is capable of being selectively rotated in a first direction to be sandwiched with a first side of the other one of the first and second frames, and a second direction opposite to the first direction to be sandwiched with a second side of said other one of the first and second frames, the first and second sides being opposite sides of said other one of the first and second frames.

7. The plural-view device of claim 5, wherein the second frame comprises a slot defined therein, the first frame comprises a block protruding from a backside thereof, and the block is movably engaged in the slot such that the first frame is slidable relative to the second frame.

8. The plural-view device of claim 1, wherein the side border of the at least one of the first frame and the second frame further comprises a second groove defined therein, the support rod is located between the first and second grooves, and the camera module is selectively received in one of the first and second grooves when the support rod is rotated to be parallel with the side border.

9. A plural-view device comprising:
   a plane mirror;
   a display panel;
   a first frame holding the plane mirror;
   a second frame holding the display panel;
   a support member pivotably connected to a side border of at least one of the first frame and the second frame and being collapsible relative to at least one of the plane mirror and the display panel, the side border of the at least one of the first frame and the second frame comprising a first groove defined therein; and
   a camera module with an adjustable field of view mounted to the support member, and being electrically connected with the display panel, wherein the support member is movable between an extended position in which the camera module is positioned to capture a view of an object and a stowed position in which substantially the entire support member closely abuts said at least one of the plane mirror and the display panel, with the camera module capable of being received in the first groove when the support member is in the stowed position.

10. The plural-view device of claim 9, wherein the support member comprises one of a flexible rod, an extension rod, and a combination of a flexible rod and an extension rod.

11. The plural-view device of claim 9, wherein the side border of the at least one of the first frame and the second frame further comprises a second groove defined therein, the support member is located between the first and second grooves, and the camera module is selectively received in one of the first and second grooves when the support member is in the stowed position.

12. A plural-view device comprising:
    a plane mirror;
    a display panel being collapsible relative to the plane mirror;
    a first frame holding the plane mirror;
    a second frame holding the display panel;
    a support member pivotably connected to a side border of at least one of the first frame and the second frame, the side border of the at least one of the first frame and the second frame comprising a first groove defined therein; and
    a camera module mounted to the support member, and being electrically connected with the display panel, a position of the support member being adjustable relative to at least one of the plane mirror and the display panel for adjusting a field of view of the camera module, the camera module capable of being received in the first groove when the support member is adjusted to be parallel with the side border, and the first frame and the second frame being movably connected to each other such that at least one of the display panel and the plane mirror is capable of being moved so that the display panel and the plane mirror are sandwiched together parallel to each other.

13. The plural-view device of claim 12, wherein the second frame is pivotably connected to the first frame.

14. The plural-view device of claim 12, wherein the second frame comprises a slot defined therein, the first frame comprises a block protruding from a backside thereof, and the block is movably engaged in the slot such that the first frame is slidable relative to the second frame.

15. The plural-view device of claim 12, wherein the side border of the at least one of the first frame and the second frame further comprises a second groove defined therein, the support member is located between the first and second grooves, and the camera module is selectively received in one of the first and second grooves when the support member is adjusted to be parallel with the side border.

* * * * *